United States Patent
Chen et al.

(10) Patent No.: US 11,664,831 B2
(45) Date of Patent: May 30, 2023

(54) RADIO FREQUENCY ASSEMBLY AND ELECTRONIC DEVICE

(71) Applicant: GUANGDONG OPPO MOBILE TELECOMMUNICATIONS CORP., LTD., Guangdong (CN)

(72) Inventors: Feng Chen, Guangdong (CN); Lin Tong, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/136,412

(22) Filed: Dec. 29, 2020

(65) Prior Publication Data

US 2021/0203368 A1    Jul. 1, 2021

(30) Foreign Application Priority Data

Dec. 31, 2019 (CN) .......................... 201911406554.0

(51) Int. Cl.
*H04B 1/00* (2006.01)
*H04B 1/44* (2006.01)

(52) U.S. Cl.
CPC ............. *H04B 1/0064* (2013.01); *H04B 1/44* (2013.01)

(58) Field of Classification Search
CPC .... H04B 1/005; H04B 1/0064; H04B 1/0067; H04B 1/0075; H04B 1/40; H04B 1/44;
(Continued)

(56) References Cited

U.S. PATENT DOCUMENTS 10,158,163 B2    12/2018 Gang et al.
2013/0028148 A1*  1/2013 Heo ....................... H04B 1/406
                                                             370/278
(Continued)

FOREIGN PATENT DOCUMENTS

CN    202309698 U    7/2012
CN    104980200 A   10/2015
(Continued)

OTHER PUBLICATIONS

Extended European Search Report for EP Application 20215086.8 dated May 18, 2021. (8 pages).
(Continued)

*Primary Examiner* — Young T. Tse
(74) *Attorney, Agent, or Firm* — Young Basile Hanlon & MacFarlane, P.C.

(57) ABSTRACT

The present disclosure relates to a radio frequency assembly and an electronic device. The radio frequency assembly includes: a radio frequency transceiver module, a first antenna, a second antenna, a first duplexer, and a second duplexer; the radio frequency transceiver module is configured to transmit and receive radio frequency signals; the first antenna is configured to transmit a first transmission signal and receive a first primary reception signal; the first duplexer is configured to insulate the first transmission signal from the first primary reception signal; the second antenna is configured to transmit a second transmission signal and receive a second primary reception signal; the second duplexer is configured to insulate the second transmission signal from the second primary reception signal.

19 Claims, 5 Drawing Sheets

(58) Field of Classification Search
CPC .......... H04B 1/50; H04B 7/04; H04B 7/0404; H04B 7/0491; H04B 7/14
USPC ....... 375/219, 220, 259, 260, 262, 265, 267; 370/278, 281, 282, 295, 334; 455/500, 455/84, 88
See application file for complete search history.

(56) References Cited

U.S. PATENT DOCUMENTS

| | | | |
|---|---|---|---|
| 2015/0109977 | A1 | 4/2015 | Loh |
| 2015/0110229 | A1* | 4/2015 | Kim ............... H04B 7/082 375/347 |
| 2017/0054199 | A1 | 2/2017 | Gang et al. |
| 2017/0373730 | A1* | 12/2017 | Pehlke ............... H04B 7/0413 |
| 2018/0278275 | A1 | 9/2018 | Leung |
| 2018/0294858 | A1 | 10/2018 | Pehlke |
| 2018/0367168 | A1* | 12/2018 | Lee ............... H04B 1/0057 |
| 2020/0186400 | A1* | 6/2020 | Lee ............... H04B 1/525 |
| 2021/0194515 | A1* | 6/2021 | Go ............... H04B 1/401 |
| 2021/0226672 | A1* | 7/2021 | Cho ............... H04B 1/0064 |

FOREIGN PATENT DOCUMENTS

| | | | |
|---|---|---|---|
| CN | 105281819 A | | 1/2016 |
| CN | 105306112 A | | 2/2016 |
| CN | 105553505 A | * | 5/2016 |
| CN | 105656610 A | | 6/2016 |
| CN | 106252845 A | * | 12/2016 |
| CN | 106252845 A | | 12/2016 |
| CN | 106921405 A | | 7/2017 |
| CN | 106981724 A | | 7/2017 |
| CN | 107124191 A | | 9/2017 |
| CN | 107124212 A | | 9/2017 |
| CN | 107465445 A | | 12/2017 |
| CN | 107769814 A | * | 3/2018 |
| CN | 107834162 A | | 3/2018 |
| CN | 108054163 A | | 5/2018 |
| CN | 108461891 A | | 8/2018 |
| CN | 207800900 U | | 8/2018 |
| CN | 109004947 A | | 12/2018 |
| CN | 109474284 A | | 3/2019 |
| CN | 109672455 A | * | 4/2019 ............ H04B 1/006 |
| CN | 110086481 A | | 8/2019 |
| CN | 110166073 A | | 8/2019 |
| CN | 110190860 A | | 8/2019 |
| CN | 110267255 A | | 9/2019 |
| CN | 110518932 A | | 11/2019 |
| CN | 209805818 U | | 12/2019 |
| CN | 111147100 A | | 5/2020 |
| CN | 111769849 A | | 10/2020 |

OTHER PUBLICATIONS

Chinese First Office Action with English Translation for CN Application 202011307863.5 dated Jun. 28, 2021. (14 pages).
Chinese Notification to Grant Patent Right for Invention with English Translation for CN Application 202010507523.0 dated Jun. 21, 2021. (6 pages).
International Search Report for International Application PCT/CN2020/138774, dated Mar. 23, 2021. (9 pages).
China First Office Action with English Translation for CN Application 202010507523.0 dated Feb. 5, 2021. (18 pages).
International Search Report with English Translation for International Application PCT/CN2020/139380 dated Mar. 24, 2021 (22 pages).
Chinese Second Office Action with English Translation for CN Application 202011307863.5 dated Dec. 3, 2021. (18 pages).
Chinese First Office Action with English Translation for CN Application 202011481537.6 dated Nov. 23, 2021. (21 pages).
Chinese Second Office Action and English Translation for Chinese Application No. 202011581686.X dated Apr. 14, 2022 (12 pages).
Chinese Second Office Action and English Translation for Chinese Application No. 202011481537.6 dated May 11, 2022 (15 pages).
Chinese Third Office Action with English Translation for CN Application 202011581686.X, dated Jul. 19, 2022. (8 pages).
Chinese Rejection decision with English Translation for CN Application 202011481537.6, dated Oct. 27, 2022 (9 pages).
Chinese Rejection decision with English Translation for CN Application 202011581686.X, dated Jan. 9, 2023. (14 pages).
Chinese First Office Action with English Translation for CN Application 202080073327.5 dated Feb. 14, 2023. (12 pages).
Communication pursuant to Article 94(3) EPC for EP Application 20215086.8 dated Mar. 21, 2023. (8 pages).

* cited by examiner

RADIO FREQUENCY ASSEMBLY AND ELECTRONIC DEVICE

CROSS-REFERENCE TO RELATED APPLICATION(S)

The present application claims foreign priority of Chinese Patent Application No. 201911406554.0, filed on Dec. 31, 2019, the entire contents of which are hereby incorporated by reference.

TECHNICAL FIELD

The present disclosure relates to the technical field of antennas, and in particular, to a radio frequency assembly and an electronic device.

BACKGROUND

With development and progress of technology, 5G communication technology has gradually begun to be applied. 5G mobile networks include independent networking and non-independent networking modes. Among them, the independent networking mode is higher in cost; in order to save cost, the non-independent networking mode is currently mainly used. In the non-independent networking mode, a 4G and 5G dual connection mode is usually adopted. Therefore, for mobile communication electronic devices, it is urgently required that communication in the 4G and 5G dual connection mode can be achieved.

It needs to explained that the information disclosed in the above background art section is only used to enhance the understanding of the background of the present disclosure, and therefore may include information that does not constitute the prior art known to those of ordinary skill in the art.

SUMMARY

According to one embodiment of the present disclosure, a radio frequency assembly is provided, the radio frequency assembly comprises: a radio frequency transceiver module configured to transmit and receive radio frequency signals; a first antenna configured to transmit a first transmission signal and receive a first primary reception signal; a first duplexer having a first end connected with the radio frequency transceiver module and a second end connected with the first antenna, and configured to insulate the first transmission signal from the first primary reception signal; a second antenna configured to transmit a second transmission signal and receive a second primary reception signal, wherein a working frequency band of the first antenna is different from a working frequency band of the second antenna; and a second duplexer having a first end connected with the radio frequency transceiver module and a second end connected with the second antenna, and configured to insulate the second transmission signal from the second primary reception signal; an additional antenna configured to receive the first diversity reception signal and the second diversity reception signal; and an additional filter connected to the fifth antenna and the radio transceiver module respectively, and configured to filter the first diversity reception signal and the second diversity reception signal.

According to a second aspect of the present disclosure, an electronic device is provided, the electronic device comprises the aforesaid radio frequency assembly.

BRIEF DESCRIPTION OF DRAWINGS

The drawings herein are incorporated into the specification and constitute a part of the specification. They show embodiments conforming to the present disclosure and are used to illustrate the principle of the present disclosure in combination with the specification. Obviously, the drawings in the following description are merely some embodiments of the present disclosure. For one of ordinary skill in the art, it is also possible to obtain other drawings according to these drawings without paying any creative work.

DETAILED DESCRIPTION

Figure 1:
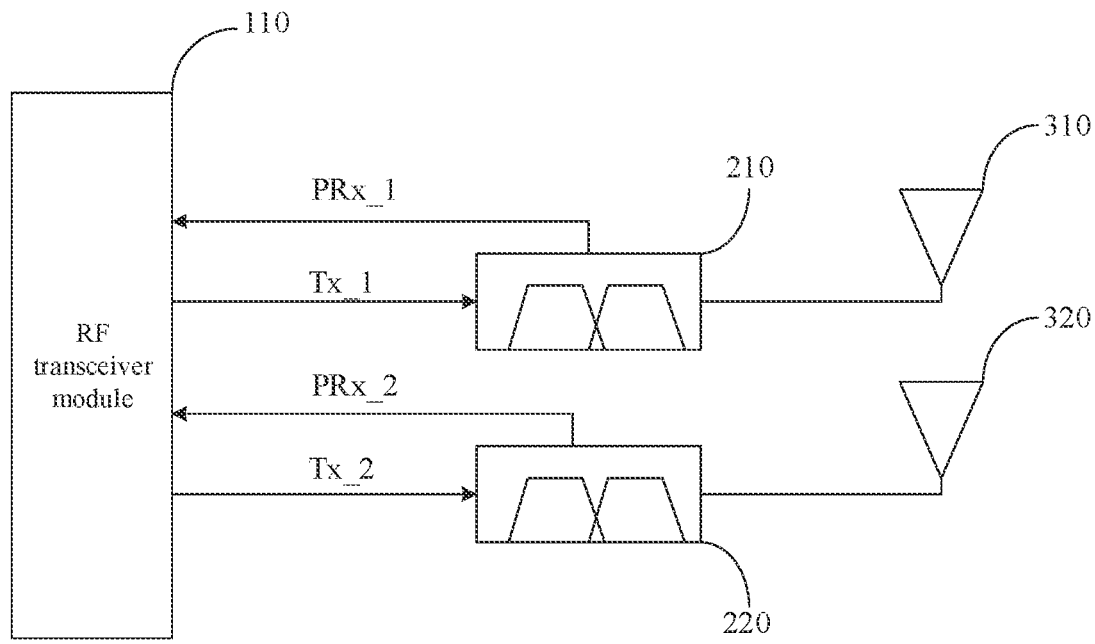
FIG. 1 is a schematic view of a first type of radio frequency assembly provided by an exemplary embodiment of the present disclosure.

Exemplary embodiments will now be described more comprehensively with reference to the accompanying drawings. However, the exemplary embodiments can be implemented in various forms, and should not be construed as being limited to the embodiments set forth herein; on the contrary, these embodiments are provided so that the present invention will be comprehensive and complete, and the concept of the exemplary embodiments is comprehensively conveyed to those skilled in the art. The same reference numerals in the figures represent the same or similar structures, and thus their detailed descriptions will be omitted.

Electronic devices achieve wireless communication through radio frequency assemblies. With development of 5G technology, it is required that electronic devices can achieve 4G communication and 5G communication simultaneously. That is, a radio frequency assembly of an electronic device need to have both a 4G communication signal transceiving function and a 5G communication signal transceiving function.

According to a first aspect of the present disclosure, a radio frequency assembly is provided, the radio frequency assembly comprises: a radio frequency transceiver module configured to transmit and receive radio frequency signals; a first antenna configured to transmit a first transmission signal and receive a first primary reception signal; a first duplexer having a first end connected with the radio frequency transceiver module and a second end connected with the first antenna, and configured to insulate the first transmission signal from the first primary reception signal; a second antenna configured to transmit a second transmission signal and receive a second primary reception signal, wherein a working frequency band of the first antenna is different from a working frequency band of the second antenna; and a second duplexer having a first end connected with the radio frequency transceiver module and a second end connected with the second antenna, and configured to insulate the second transmission signal from the second primary reception signal; an additional antenna configured to receive the first diversity reception signal and the second diversity reception signal; and an additional filter connected to the additional antenna and the radio transceiver module respectively, and configured to filter the first diversity reception signal and the second diversity reception signal.

In some embodiments, the first end of the first duplexer comprises a first sub-end and a second sub-end, the first sub-end is connected to the radio frequency transceiver module to transmit the first transmission signal, and the second sub-end is connected to the radio frequency transceiver module to transmit the first primary reception signal.

In some embodiments, the radio frequency assembly further comprises a first amplifier circuit having a first end connected to the radio frequency transceiver module and a second end connected to the first sub-end of the first duplexer and configured to amplify the first transmission signal.

In some embodiments, the first end of the second duplexer comprises a first sub-end and a second sub-end, the first sub-end is connected to the radio frequency transceiver module to transmit the second transmission signal, and the second sub-end is connected to the radio frequency transceiver module to transmit the second primary reception signal.

In some embodiments, the radio frequency assembly further comprises a second amplifier circuit having a first end connected to the radio frequency transceiver module and a second end connected to the first sub-end of the second duplexer and configured to amplify the second transmission signal.

In some embodiments, the radio frequency assembly further comprises a third antenna configured to receive a first diversity reception signal; and a first filter connected to the third antenna and the radio frequency transceiver module respectively and configured to filter the first diversity reception signal.

In some embodiments, the radio frequency assembly further comprises: a fourth antenna configured to receive a second diversity reception signal; and a second filter connected to the fourth antenna and the radio frequency transceiver module respectively and configured to filter the first diversity reception signal.

In some embodiments, the radio frequency assembly further comprises: a third amplifier circuit; wherein between each of the first filter, the second filter, the second sub-end of the first duplexer, and the second sub-end of the second duplexer and the radio frequency transceiver module, the third amplifier circuit is provided.

In some embodiments, the first antenna is configured to receive a primary reception signal in a 4G frequency band and transmit a transmission signal in the 4G frequency band, the second antenna is configured to receive a primary reception signal in a 5G frequency band and transmit a transmission signal in the 5G frequency band, and the additional antenna is configured to receive a diversity reception signal in the 4G frequency band and a diversity reception signal in the 5G frequency band.

In some embodiments, the radio frequency assembly is configured to implement dual connection communication in B20 and n28a frequency bands; a working frequency band of the first antenna is B20 frequency band, a working frequency band of the second antenna is n28a frequency band, and a working frequency band of the additional antenna covers at least a part of B20 frequency band and a part of n28a frequency band.

In some embodiments, the first antenna is configured to receive a primary reception signal in a first 4G frequency band and transmit a transmission signal in the first 4G frequency band, the second antenna is configured to receive a primary reception signal in a second 4G frequency band and transmit a transmission signal in the second 4G frequency band, and the additional antenna is configured to receive a diversity reception signal in the first 4G frequency band and a diversity reception signal in the second 4G frequency band.

In some embodiments, the radio frequency assembly is configured to implement carrier aggregation in B20 and B28a frequency bands; a working frequency band of the first antenna is B20 frequency band, a working frequency band of the second antenna is B28a frequency band, and a working frequency band of the additional antenna covers at least a part of B20 frequency band and a part of B28a frequency band.

In some embodiments, the first antenna is configured to receive a primary reception signal in a first 5G frequency band and transmit a transmission signal in the first 5G frequency band, the second antenna is configured to receive a primary reception signal in a second 5G frequency band and transmit a transmission signal in the second 5G frequency band, and the additional antenna is configured to receive a diversity reception signal in the first 5G frequency band and a diversity reception signal in the second 5G frequency band.

In some embodiments, the radio frequency assembly is configured to implement carrier aggregation in n20 and n28a frequency bands; a working frequency band of the first antenna is n20 frequency band, a working frequency band of the second antenna is n28a frequency band, and a working frequency band of the additional antenna covers at least a part of n20 frequency band and a part of n28a frequency band.

According to a second aspect of the present disclosure, an electronic device is provided. The electronic device comprises the radio frequency assembly according to the aforesaid first aspect of the present disclosure.

In some embodiments, the first antenna is configured to receive a primary reception signal in a first frequency band and transmit a transmission signal in the first frequency band, the second antenna is configured to receive a primary reception signal in a second frequency band and transmit a transmission signal in the second frequency band, the additional antenna is configured to receive a diversity reception signal in the first frequency band and a diversity reception signal in the second frequency band, and the radio frequency assembly is configured to implement dual connection communication in the first and second frequency bands or carrier aggregation in the first and second frequency bands.

In some embodiments, the first antenna is configured to receive a primary reception signal in a 4G frequency band and transmit a transmission signal in the 4G frequency band, the second antenna is configured to receive a primary reception signal in a 5G frequency band and transmit a transmission signal in the 5G frequency band, and the additional antenna is configured to receive a diversity reception signal in the 4G frequency band and a diversity reception signal in the 5G frequency band.

In some embodiments, the radio frequency assembly is configured to implement dual connection communication in B20 and n28a frequency bands; a working frequency band of the first antenna is B20 frequency band, a working frequency band of the second antenna is n28a frequency band, and a working frequency band of the additional antenna covers at least a part of B20 frequency band and a part of n28a frequency band.

In some embodiments, the first antenna is configured to receive a primary reception signal in a first 5G frequency band and transmit a transmission signal in the first 5G frequency band, the second antenna is configured to receive a primary reception signal in a second 5G frequency band and transmit a transmission signal in the second 5G frequency band, and the additional antenna is configured to receive a diversity reception signal in the first 5G frequency band and a diversity reception signal in the second 5G frequency band.

In some embodiments, the radio frequency assembly is configured to implement carrier aggregation in n20 and n28a frequency bands; a working frequency band of the first antenna is n20 frequency band, a working frequency band of the second antenna is n28a frequency band, and a working frequency band of the additional antenna covers at least a part of n20 frequency band and a part of n28a frequency band.

In an exemplary embodiment, a radio frequency assembly is first provided. The radio frequency assembly can be used in electronic devices such as mobile phones, tablet computers, electronic readers, smart televisions, wearable terminals, vehicular computers, and so on. As shown in FIG. 1, an electronic device comprises a radio frequency transceiver module 110, a first antenna 310, a second antenna 320, a first duplexer 210, and a second duplexer 220. The radio frequency transceiver module 110 is configured to transmit and receive radio frequency signals; the first antenna 310 is configured to transmit a first transmission signal (Tx_1) and receive a first primary reception signal (PRx_1); a first end of the first duplexer 210 is connected with the radio frequency transceiver module 110, a second end of the first duplexer 210 is connected with the first antenna 310, and the first duplexer 210 is configured to insulate the first transmission signal from the first primary reception signal; The second antenna 320 is configured to transmit a second transmission signal (Tx_2) and receive a second primary reception signal (PRx_2), a first end of the second duplexer 220 is connected with the radio frequency transceiver module 110, a second end of the second duplexer 220 is connected with the second antenna 320, and the second duplexer 220 is configured to insulate the second transmission signal from the second primary reception signal.

In the radio frequency assembly provided by this embodiment of the present disclosure, the first antenna 310 transmits a first transmission signal and receives a first primary reception signal, the first duplexer 210 insulates the first transmission signal from the first primary reception signal, the second antenna 320 transmits a second transmission signal and receives a second primary reception signal, and the second duplexer 220 insulates the second transmission signal from the second primary reception signal; wherein, the first antenna 310 can be used for 4G communication, and the second antenna 320 can be used for 5G communication, therefore the electronic device is enabled to achieve communication in dual-connection of 4G and 5G in a non-independent networking mode, and is simple in structure and easy to be realized.

Figure 3:
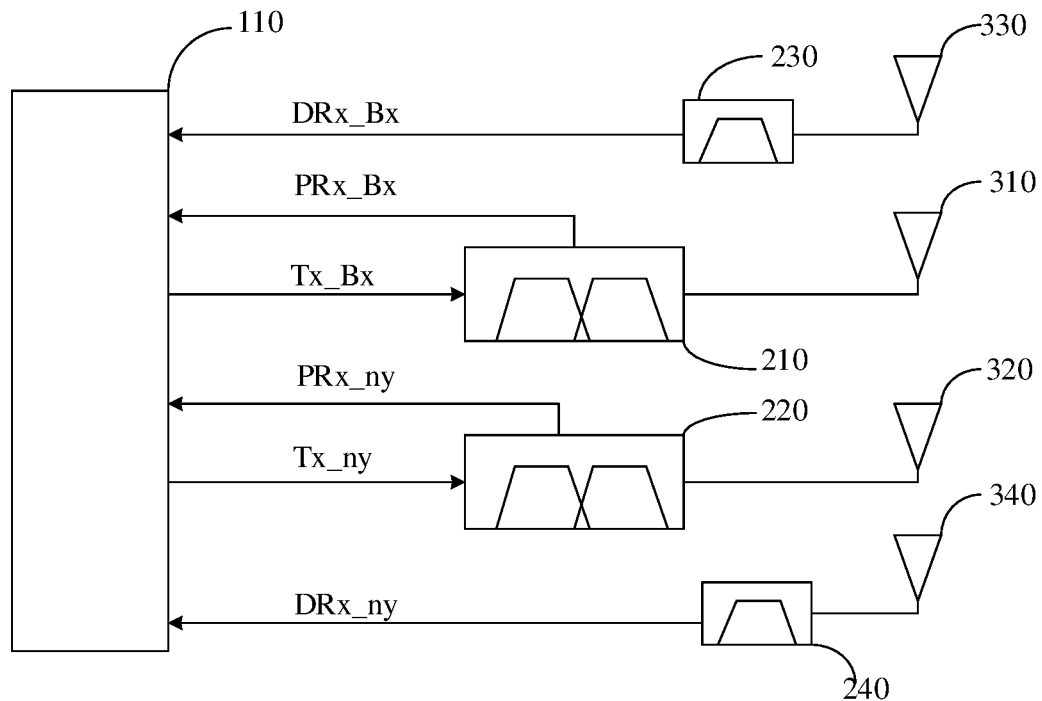
FIG. 3 is a schematic view of a third type of radio frequency assembly provided by an exemplary embodiment of the present disclosure.

In a possible embodiment, as shown in FIG. 3, a radio frequency assembly provided by an embodiment of the present disclosure can further comprise a third antenna 330, a first filter 230, a fourth antenna 340, and a second filter 240. The third antenna 330 is configured to receive a first diversity reception signal; the first filter 230 is connected to the third antenna 330 and the radio frequency transceiver module 110 respectively, and the first filter 230 is configured to filter the first diversity reception signal. The fourth antenna 340 is configured to receive a second diversity reception signal; the second filter 240 is connected to the fourth antenna 340 and the radio frequency transceiver module 110 respectively, and is configured to filter the second diversity reception signal.

In this embodiment, the first primary reception signal and the first diversity reception signal are downlink signals received according to a first transmission signal in uplink signals in a first working frequency band. The first primary reception signal and the first diversity reception signal are downlink signals received according to a second transmission signal in uplink signals in a second working frequency band.

Figure 2:
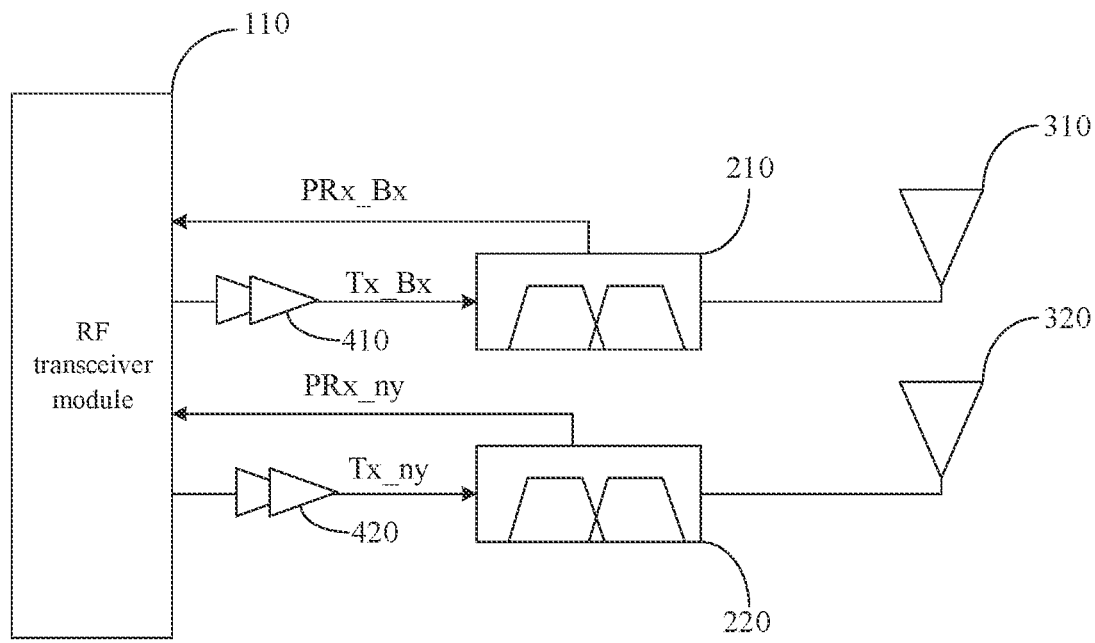
FIG. 2 is a schematic view of a second type of radio frequency assembly provided by an exemplary embodiment of the present disclosure.

As shown in FIG. 2, the first end of the first duplexer 210 includes a first sub-end and a second sub-end, the first sub-end is connected to the radio frequency transceiver module 110 to transmit the first transmission signal, and the second sub-end is connected to the radio frequency transceiver module 110 to transmit the first primary reception signal.

On this basis, the radio frequency assembly can further comprises a first amplifier circuit 410, a first end of the first amplifier circuit 410 is connected to the radio frequency transceiver module 110, a second end of the first amplifier circuit 410 is connected to the first sub-end of the first duplexer 210, and the first amplifier circuit 410 is configured to amplify the first transmission signal. The first amplifier circuit 410 can includes a power amplifier.

The first end of the second duplexer 220 includes a first sub-end and a second sub-end, the first sub-end is connected to the radio frequency transceiver module 110 to transmit the second transmission signal, and the second sub-end is connected to the radio frequency transceiver module 110 to transmit the second primary reception signal.

On this basis, the radio frequency assembly can further comprise a second amplifier circuit 420, a first end of the second amplifier circuit 420 is connected to the radio frequency transceiver module 110, a second end of the second amplifier circuit 420 is connected to the first sub-end of the second duplexer 220, and the second amplifier circuit 420 is configured to amplify the second transmission signal. The second amplifier circuit 420 can include a power amplifier.

In this embodiment, the radio frequency assembly provided by this embodiment of the present disclosure can be a frequency division duplex (FDD) frequency assembly, that is, uplink frequency bands and downlink frequency bands of various paths of signals are different, therefore it is possible to insulate the first transmission signal from the first primary reception signal by the first duplexer 210 and insulate the second transmission signal from the second primary reception signal by the second duplexer 220.

The first transmission signal (Tx_Bx) can be an LTE (Long Term Evolution) low frequency signal, the second transmission signal (Tx_ny) can be a 5G NR (5G new radio) low frequency signal. Correspondingly, the first primary reception signal (PRx_Bx) can the first diversity reception signal (DRx_Bx) can be LTE low frequency signals; the second primary reception signal (PRx_ny) and the second diversity reception signal (DRx_ny) can be 5G NR low frequency signals. That is, the first antenna 310 is a 4G antenna, and the second antenna 320 is a 5G antenna.

Exemplarily, a frequency band of the first transmission signal is B20, a frequency band of the second transmission signal is n28a. A working frequency band of the first antenna 310 is B20, and a working frequency band of the second antenna 320 is n28a. Of course, in actual use, the frequency band (Bx) of the first transmission signal and the frequency band (ny) of the second transmission signal can also be other frequency bands, and embodiments of the present disclosure are not limited here.

In this embodiment, the B20 frequency band has an uplink frequency of 832 MHz-862 MHz and a downlink frequency of 791 MHz-821 MHz. The n28a frequency band has an uplink frequency of 703 MHz-733 MHz and a downlink frequency of 758 MHz-788 MHz. Therefore, a frequency of the first antenna 310 is 832 MHz-862 MHz, a frequency of the second antenna 320 is 703 MHz-733 MHz, a frequency of the third antenna 330 is 791 MHz-821 MHz, and a frequency of the fourth antenna 340 is 758 MHz-788 MHz.

The present disclosure provides a four-antenna solution, which realizes complete decoupling for antennas of two frequency bands in a combination of an FDD low frequency with a low frequency EN-DC (E-UTRA and New radio Dual Connectivity, which is a dual-connection between a 4G wirelessly accessed network and a 5G NR). The duplexers and the filters used in circuits are all conventional components and are low in cost; when a low frequency band is split, the problem that it is difficult to achieve a wide frequency band in a low frequency of a mobile phone can be avoided, and it is easier to achieve antennas.

Alternatively, the first transmission signal (Tx_Bx) can be an LTE low frequency signal, and the second transmission signal (Tx_By) can be an LTE low frequency signal. Correspondingly, the first primary reception signal (PRx_Bx) and the first diversity reception signal (DRx_Bx) can be LTE low frequency signals; the second primary reception signal (PRx_By) and the second diversity reception signal (DRx_By) can be LTE low frequency signals; that is, the first antenna 310 is a 4G antenna, and the second antenna 320 is a 4G antenna.

Exemplarily, a frequency band of the first transmission signal is B20, a frequency band of the second transmission signal is B28a. A working frequency band of the first antenna 310 is B20, and a working frequency band of the second antenna 320 is B28a. Of course, in actual use, the frequency band (Bx) of the first transmission signal and the frequency band (By) of the second transmission signal can also be other frequency bands, and embodiments of the present disclosure are not limited here.

In this embodiment, the B20 frequency band has an uplink frequency of 832 MHz-862 MHz and a downlink frequency of 791 MHz-821 MHz. The B28a frequency band has an uplink frequency of 703 MHz-725.5 MHz and a downlink frequency of 758 MHz-788 MHz. Therefore, a frequency of the first antenna 310 is 832 MHz-862 MHz, a frequency of the second antenna 320 is 703 MHz-725.5 MHz, a frequency of the third antenna 330 is 791 MHz-821 MHz, and a frequency of the fourth antenna 340 is 758 MHz-788 MHz.

Alternatively, the first transmission signal (Tx_nx) can be a 5G NR low frequency signal, and the second transmission signal (Tx_ny) can be a 5G NR low frequency signal. Correspondingly, the first primary reception signal (PRx_nx) and the first diversity reception signal (DRx_nx) can be 5G NR low frequency signals; the second primary reception signal (PRx_ny) and the second diversity reception signal (DRx_ny) can be 5G NR low frequency signals; that is, the first antenna 310 is a 5G antenna, and the second antenna 320 is a 5G antenna.

Exemplarily, a frequency band of the first transmission signal is n20, a frequency band of the second transmission signal is n28a. A working frequency band of the first antenna 310 is n20, and a working frequency band of the second antenna 320 is n28a. Of course, in actual use, the frequency band (nx) of the first transmission signal and the frequency band (ny) of the second transmission signal can also be other frequency bands, and embodiments of the present disclosure are not limited here.

In this embodiment, the n20 frequency band has an uplink frequency of 832 MHz-862 MHz and a downlink frequency of 791 MHz-821 MHz. The n28a frequency band has an uplink frequency of 703 MHz-733 MHz and a downlink frequency of 758 MHz-788 MHz. Therefore, a frequency of the first antenna 310 is 832 MHz-862 MHz, a frequency of the second antenna 320 is 703 MHz-733 MHz, a frequency of the third antenna 330 is 791 MHz-821 MHz, and a frequency of the fourth antenna 340 is 758 MHz-788 MHz.

The radio frequency transceiver assembly 110 can comprise a first transmission unit, a second transmission unit, a first primary reception unit, a second primary reception unit, a first diversity reception unit, and a second diversity reception unit. The first transmission unit is connected to the first amplifier circuit 410, and the first transmission unit is configured to transmit the first transmission signal. The second transmission unit is connected to the second amplifier circuit 420, and the second transmission unit is configured to transmit the second transmission signal. The first primary reception unit is connected to the second sub-end of the first duplexer 210, and the first primary reception unit is configured to receive the first primary reception signal. The second primary reception unit is connected to the second sub-end of the second duplexer 220, and the second primary reception unit is configured to receive the second primary reception signal. The first diversity reception unit is connected to the first filter 230, and the first diversity reception unit is configured to receive the first diversity reception signal. The second diversity reception unit is connected to the second filter 240, and the second diversity reception unit is configured to receive the second diversity reception signal.

On this basis, a radio frequency assembly provided by an embodiment of the present disclosure can further comprises a plurality of third amplifier circuits 430. Between each of the first filter 230, the second filter 240, the second sub-end of the first duplexer 210, and the second sub-end of the second duplexer 220 and the radio frequency transceiver module 110, a third amplifier circuit 430 is provided.

Figure 4:
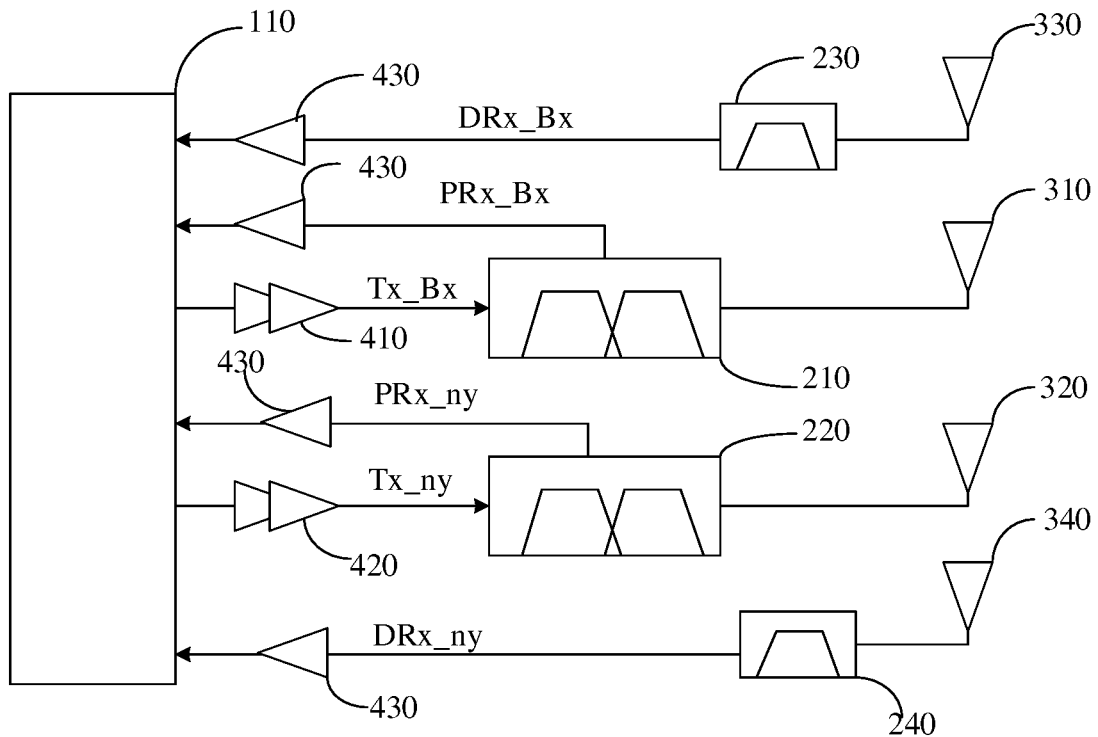
FIG. 4 is a schematic view of a fourth type of radio frequency assembly provided by an exemplary embodiment of the present disclosure.

As shown in FIG. 4, a third amplifier circuit 430 is connected between the first filter 230 and the first diversity reception unit and configured to amplify the first diversity reception signal. A third amplifier circuit 430 is connected between the second filter 240 and the second diversity reception unit and configured to amplify the second diversity reception signal. A third amplifier circuit 430 is connected between the second sub-end of the first duplexer 210 and the first primary reception unit to amplify the first primary reception signal. A third amplifier circuit 430 is connected between the second sub-end of the second duplexer 220 and the second primary reception unit to amplify the second primary reception signal.

In this embodiment, the radio frequency transceiver module 110 can be a radio frequency transceiver, and the third amplifier circuit 430 can be disposed in the radio frequency transceiver module 110 or out of the radio frequency transceiver module 110. When the third amplifier circuit 430 is disposed out of the radio frequency transceiver module 110, the third amplifier circuit 430 can be a low noise amplifier (LNA).

Figure 5:
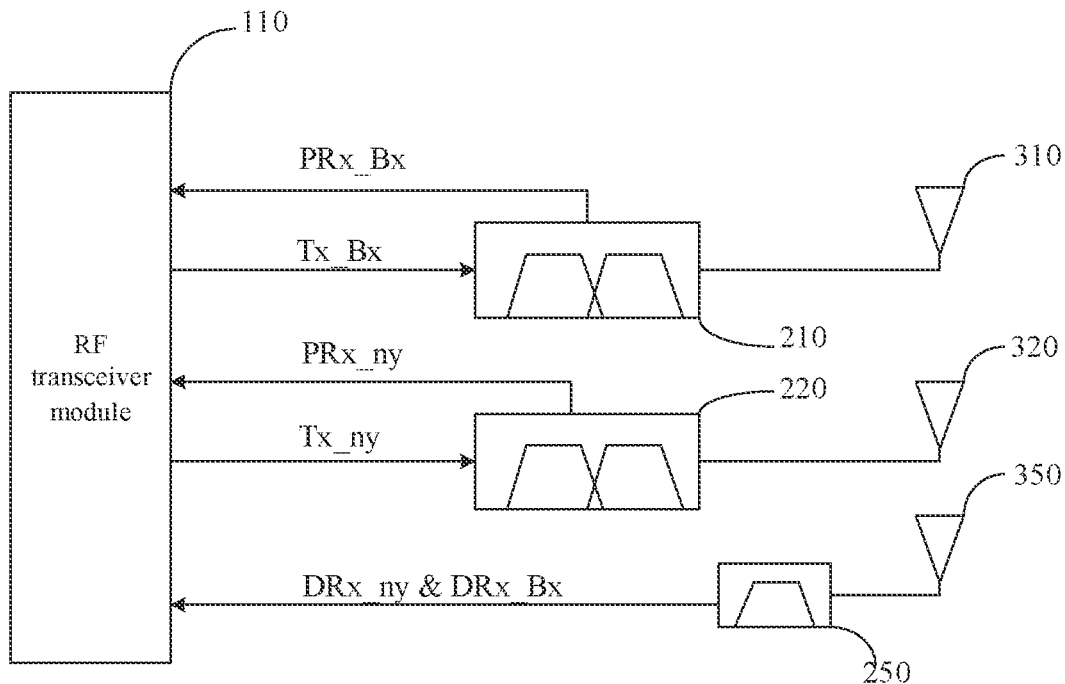
FIG. 5 is a schematic view of a fifth type of radio frequency assembly provided by an exemplary embodiment of the present disclosure.

In a possible embodiment, as shown in FIG. 5, a radio frequency assembly provided by an embodiment of the present disclosure can further comprise a fifth antenna 350 (which can also be named as an additional antenna) and a third filter 250 (which can also be named as an additional filter). The fifth antenna 350 is configured to receive the first diversity reception signal and the second diversity reception signal; the third filter 250 is respectively connected to the fifth antenna 350 and the radio frequency transceiver module 110, and the third filter 250 is configured to filter the first diversity reception signal and the second diversity reception signal.

Figure 6:
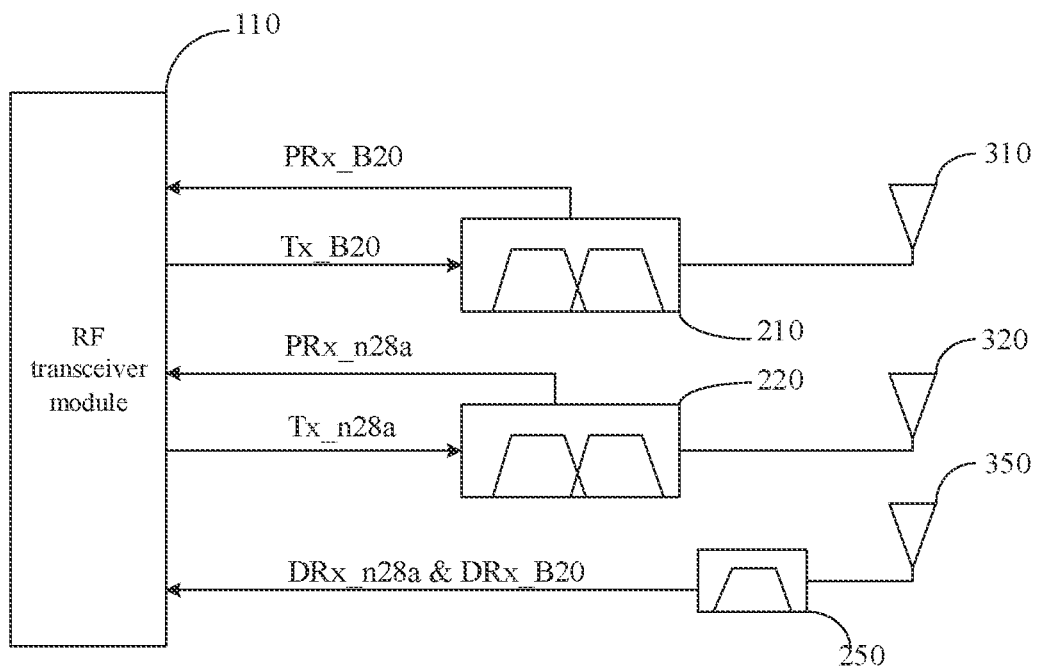
FIG. 6 is a schematic view of a sixth type of radio frequency assembly provided by an exemplary embodiment of the present disclosure.

As shown in FIG. 6, a first end of the first duplexer 210 comprises a first sub-end and a second sub-end, the first sub-end is connected to the radio frequency transceiver module 110 to transmit the first transmission signal, and the second sub-end is connected to the radio frequency transceiver module 110 to transmit the first primary reception signal.

Figure 7:
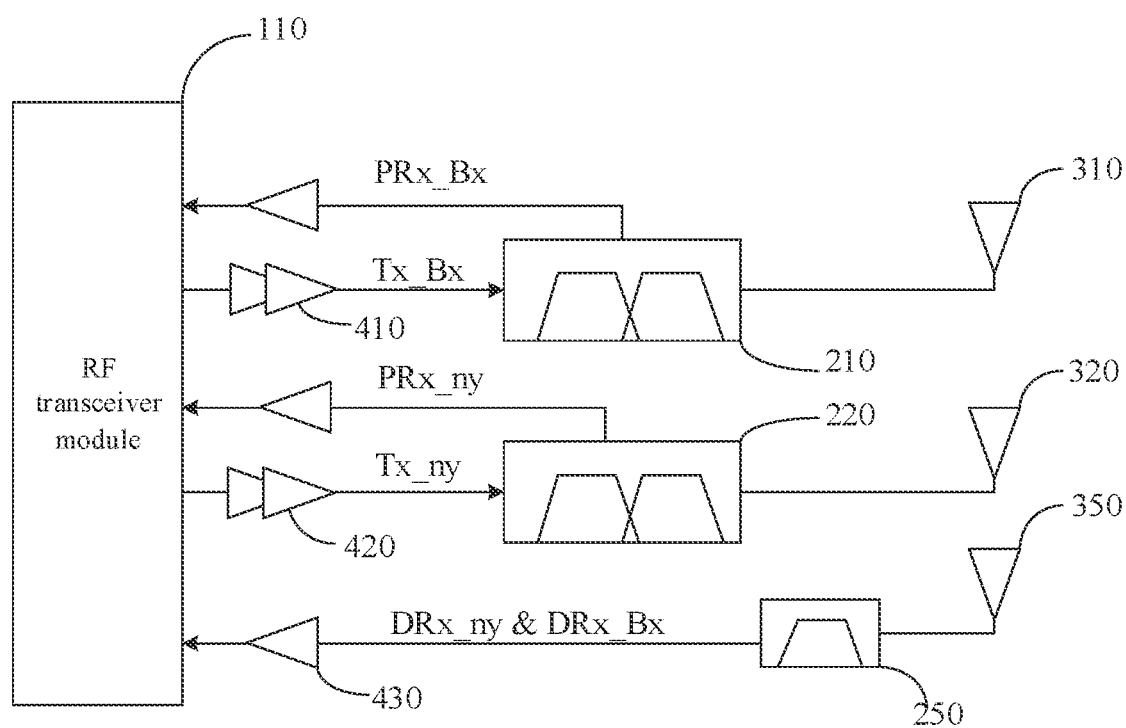
FIG. 7 is a schematic view of a seventh type of radio frequency assembly provided by an exemplary embodiment of the present disclosure.

On this basis, as shown in FIG. 7, the radio frequency assembly can further comprise a first amplifier circuit 410, a first end of the first amplifier circuit 410 is connected to the radio frequency transceiver module 110, a second end of the first amplifier circuit 410 is connected to the first sub-end of the first duplexer 210, and the first amplifier circuit 410 is configured to amplify the first transmission signal.

A first end of the second duplexer 220 comprises a first sub-end and a second sub-end, the first sub-end is connected to the radio frequency transceiver module 110 to transmit the second transmission signal, and the second sub-end is connected to the radio frequency transceiver module 110 to transmit the second primary reception signal.

On this basis, the radio frequency assembly can further comprise a second amplifier circuit 420, a first end of the second amplifier circuit 420 is connected to the radio frequency transceiver module 110, a second end of the second amplifier circuit 420 is connected to the first sub-end of the second duplexer 220, and the second amplifier circuit 420 is configured to amplify the first transmission signal.

In this embodiment, the radio frequency assembly provided by this embodiment of the present disclosure can be a frequency division duplex (FDD) frequency assembly, that is, uplink frequency bands and downlink frequency bands of various paths of signals are different, therefore it is possible to insulate the first transmission signal from the first primary reception signal by the first duplexer 210 and insulate the second transmission signal from the second primary reception signal by the second duplexer 220.

The first transmission signal (Tx_Bx) can be an LTE (Long Term Evolution) low frequency signal, the second transmission signal (Tx_ny) can be a 5G NR (5G new radio) low frequency signal. Correspondingly, the first primary reception signal (PRx_Bx) and the first diversity reception signal (DRx_Bx) can be LTE low frequency signals, and the second primary reception signal (PRx_ny) and the second diversity reception signal (DRx_ny) can be 5G NR low frequency signals; that is, the first antenna 310 can be a 4G antenna, the second antenna 320 can be a 5G antenna, and the fifth antenna is shared.

Exemplarily, a frequency band of the first transmission signal is B20, a frequency band of the second transmission signal is n28a. A working frequency band of the first antenna 310 is B20, and a working frequency band of the second antenna 320 is n28a. A frequency band of the first diversity reception signal can be B20, and a reception signal of the second diversity reception unit can be n28a. The fifth antenna 350 can receive diversity reception signals, and its frequency band can be B20 and n28a. Of course, in actual use, the frequency band (Bx) of the first transmission signal and the frequency band (ny) of the second transmission signal can also be other frequency bands, and embodiments of the present disclosure are not limited here.

In this embodiment, the B20 frequency band has an uplink frequency of 832 MHz-862 MHz and a downlink frequency of 791 MHz-821 MHz. The n28a frequency band has an uplink frequency of 703 MHz-733 MHz and a downlink frequency of 758 MHz-788 MHz. Therefore, a frequency of the first antenna 310 is 832 MHz-862 MHz, a frequency of the second antenna 320 is 703 MHz-733 MHz, and a frequency of the fifth antenna 350 is 758 MHz-821 MHz.

The present disclosure provides a three-antenna solution, which divides a spectrum into three parts. The second antenna 320 covers 703 Hz-788 Hz, amounting to 85 MHz; the first antenna 310 covers 791 MHz-862 MHz, amounting to 71 MHz; the fifth antenna 350 covers 758 MHz-821 MHz, amounting to 63 MHz. Wherein, the second antenna 320 realizes transmission and primary reception of n28, the first antenna 310 realizes transmission and primary reception of B20, and the fifth antenna 350 realizes diversity receptions of B20 and n28a simultaneously. The thee antennas can be only low frequency antennas, and can also be shared by other middle and high frequency bands. The duplexers and the filters used in circuits are all conventional components and are low in cost; when a low frequency band is split, the problem that it is difficult to achieve a wide frequency band in a low frequency of a mobile phone can be avoided, and it is easier to achieve antennas.

Alternatively, the first transmission signal (Tx_Bx) can be an LTE low frequency signal, and the second transmission signal (Tx_By) can be an LTE low frequency signal. Correspondingly, the first primary reception signal (PRx_Bx) and the first diversity reception signal (DRx_Bx) can be LTE low frequency signals, and the second primary reception signal (PRx_By) and the second diversity reception signal (DRx_By) can be LTE low frequency signals; that is, the first antenna 310 can be a 4G antenna, the second antenna 320 can be a 4G antenna, and the fifth antenna 350 is shared.

In this embodiment, the B20 frequency band has an uplink frequency of 832 MHz-862 MHz and a downlink frequency of 791 MHz-821 MHz. The B28a frequency band has an uplink frequency of 703 MHz-725.5 MHz and a downlink frequency of 758 MHz-788 MHz. Therefore, a frequency of the first antenna 310 is 832 MHz-862 MHz, a frequency of the second antenna 320 is 703 MHz-725.5 MHz, and a frequency of the fifth antenna 350 is 758 MHz-821 MHz.

Exemplarily, a frequency band of the first transmission signal is B20, a frequency band of the second transmission signal is B28a. A working frequency band of the first antenna 310 is B20, and a working frequency band of the second antenna 320 is B28a. A frequency band of the first diversity reception signal can be B20, and a reception signal of the second diversity reception unit can be B28a. The fifth antenna 350 can receive diversity reception signals, and its frequency band can be B20 and n28a. Of course, in actual use, the frequency band (Bx) of the first transmission signal and the frequency band (By) of the second transmission signal can also be other frequency bands, and embodiments of the present disclosure are not limited here.

Alternatively, the first transmission signal (Tx_nx) can be a 5G NR low frequency signal, and the second transmission signal (Tx_ny) can be a 5G NR low frequency signal.

Correspondingly, the first primary reception signal (PRx_nx) and the first diversity reception signal (DRx_nx) can be 5G NR frequency signals, and the second primary reception signal (PRx_ny) and the second diversity reception signal (DRx_ny) can be 5G NR low frequency signals; that is, the first antenna 310 can be a 5G antenna, the second antenna 320 can be a 5G antenna, and the fifth antenna 350 is shared.

Exemplarily, a frequency band of the first transmission signal is n20, a frequency band of the second transmission signal is n28a. A working frequency band of the first antenna 310 is n20, and a working frequency band of the second antenna 320 is n28a. A frequency band of the first diversity reception signal can be n20, and a reception signal of the second diversity reception unit can be n28a. The fifth antenna 350 can receive diversity reception signals, and its frequency band can be B20 and n28a. Of course, in actual use, the frequency band (nx) of the first transmission signal and the frequency band (ny) of the second transmission signal can also be other frequency bands, and embodiments of the present disclosure are not limited here.

In this embodiment, the n20 frequency band has an uplink frequency of 832 MHz-862 MHz and a downlink frequency of 791 MHz-821 MHz. The n28a frequency band has an uplink frequency of 703 MHz-733 MHz and a downlink frequency of 758 MHz-788 MHz. Therefore, a frequency of the first antenna 310 is 832 MHz-862 MHz, a frequency of the second antenna 320 is 703 MHz-733 MHz, and a frequency of the fifth antenna 350 is 758 MHz-821 MHz.

The radio frequency transceiver assembly 110 can comprise a first transmission unit, a second transmission unit, a first primary reception unit, a second primary reception unit, and a third diversity reception unit. The first transmission unit is connected to the first amplifier circuit 410, and the first transmission unit is configured to transmit the first transmission signal. The second transmission unit is connected to the second amplifier circuit 420, and the second transmission unit is configured to transmit the second transmission signal. The first primary reception unit is connected to the second sub-end of the first duplexer 210, and the first primary reception unit is configured to receive the first primary reception signal. The second primary reception unit is connected to the second sub-end of the second duplexer 220, and the second primary reception unit is configured to receive the second primary reception signal. The third diversity reception unit is connected to a third filter 250, and the third diversity reception unit is configured to receive the first diversity reception signal and the second diversity reception signal.

On this basis, a radio frequency assembly provided by an embodiment of the present disclosure can further comprises a plurality of third amplifier circuits 430. Between each of the third filter 250, the second sub-end of the first duplexer 210, and the second sub-end of the second duplexer 220 and the radio frequency transceiver module 110, a third amplifier circuit 430 is provided.

A third amplifier circuit 430 is connected between the third filter 250 and the third diversity reception unit and configured to amplify the first diversity reception signal and the second diversity reception signal. A third amplifier circuit 430 is connected between the second sub-end of the first duplexer 210 and the first primary reception unit to amplify the first primary reception signal. A third amplifier circuit 430 is connected between the second sub-end of the second duplexer 220 and the second primary reception unit to amplify the second primary reception signal.

In this embodiment, the radio frequency transceiver module 110 can be a radio frequency transceiver, and the third amplifier circuit 430 can be disposed in the radio frequency transceiver module 110 or out of the radio frequency transceiver module 110. When the third amplifier circuit 430 is disposed out of the radio frequency transceiver module 110, the third amplifier circuit 430 can be a low noise amplifier (LNA).

In the radio frequency assembly provided by this embodiment of the present disclosure, the first antenna 310 transmits a first transmission signal and receives a first primary reception signal, the first duplexer 210 insulates the first transmission signal from the first primary reception signal, the second antenna 320 transmits a second transmission signal and receives a second primary reception signal, and the second duplexer 220 insulates the second transmission signal from the second primary reception signal; wherein, the first antenna 310 can be used for 4G communication, and the second antenna 320 can be used for 5G communication, therefore the electronic device is enabled to achieve communication in dual-connection of 4G and 5G in a non-independent networking mode, and is simple in structure and easy to be realized.

An exemplary embodiment of the present disclosure further provides an electronic device, the electronic device comprises the above-mentioned radio frequency assembly.

Figure 8:
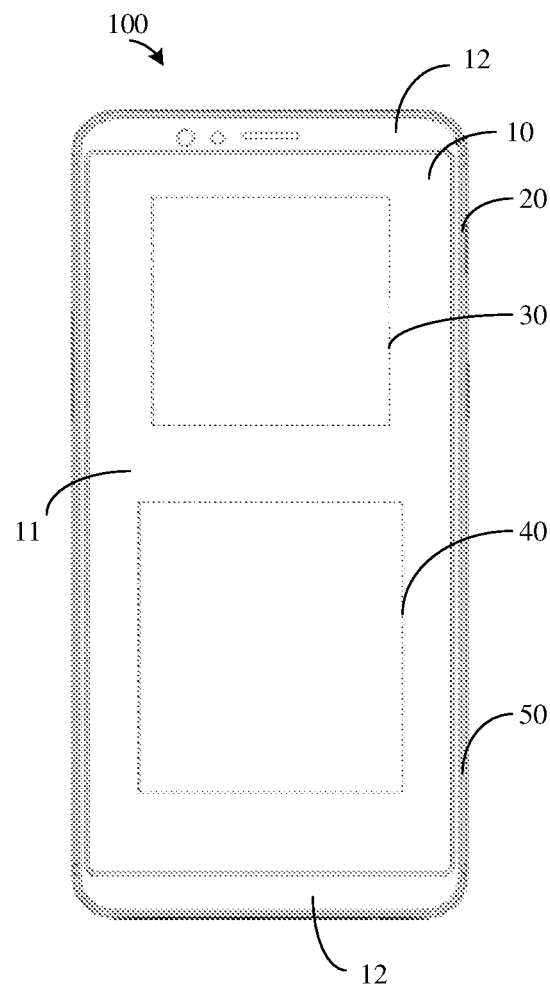
FIG. 8 is a schematic view of an electronic device provided by an exemplary embodiment of the present disclosure.

As shown in FIG. 8, an electronic device 100 provided by an embodiment of the present disclosure further comprises a display screen 10, a frame 20, a main board 30, a battery 40, and a rear cover 50. In this embodiment, the display screen 10 is mounted on the frame 20 to form a display surface of the electronic device, and the display screen 10 serves as a front casing of the electronic device. The rear cover 50 is adhered on the frame through double-sided tape, and the display screen 10, the frame 20, and the rear cover 50 form an accommodation space to accommodate other electronic components or functional modules of the electronic device 100. At the same time, the display screen 10 forms the display surface of the electronic device 100, which is used to display information such as images, texts, etc. The display screen 10 can be a display screen in a type of a liquid crystal display (LCD), an organic light-emitting diode (OLED) display, etc.

The display screen 10 can be provided thereon with a glass cover plate. In this embodiment, the glass cover plate can cover the display screen 10 to protect the display screen 10 and thereby prevent the glass cover 10 from being scratched, or damaged by water.

The display screen 10 can comprise a display area 11 and a non-display area 12. In this embodiment, the display area 11 performs a display function of the display screen 10, and is used to display information such as images, texts, etc. The non-display area 12 does not display information. The non-display area 12 can be used to dispose functional modules such as a camera, a receiver, a proximity sensor, etc. In some embodiments, the non-display area 12 can comprise at least one region located at an upper portion and a lower portion of the display area 11.

The display screen 10 can be a full screen. On this condition, the display screen 10 can display information with the whole screen, so that the electronic device 100 has a big screen-to-body ratio. The display screen 10 only comprises the display area 11, but does not comprise the non-display area. On this condition, the functional modules in the electronic device 100, such as the camera, the proximity sensor, etc., can be hidden under the display screen 10, and a fingerprint identification module of the electronic device 100 can be disposed on a back surface of the electronic device 100.

The frame 20 can be a hollow frame structure. In this embodiment, the material of the frame 20 can include metal or plastics. The main board 30 is mounted in the aforesaid accommodation space. For example, the main board 30 can be mounted on the frame 20, and is accommodated in the aforesaid accommodation space along with the frame 20. The main board 30 is provided thereon with a grounded point to realize grounding of the main board 30. One or more of functional modules, such as a motor, a microphone, a speaker, a receiver, an earphone interface, a universal serial bus interface (USB interface), a camera, a proximity sensor, an environment light sensor, a gyroscope, a processor, and so on, can be integrated on the main board 30. At the same time, the display screen 10 can be electrically connected to the main board 30.

The main board 30 is provided thereon with a display control circuit. The display control circuit outputs electric signals to the display screen 10 to control the display screen 10 to display information.

The battery 40 is mounted inside the aforesaid accommodation space. For example, the battery 40 can be mounted on the frame 20, and is accommodated in the aforesaid accommodation space along with the frame 20. The battery 40 can be electrically connected to the main board 30 to realize power supply for the electronic device 100 using the battery 40. In this embodiment, the main board 30 can be provided thereon with a power management circuit. The power management circuit is used to distribute a voltage provided by the battery 40 to various electronic components in the electronic device 100.

The rear cover 50 is used to form an external contour of the electronic device 100. The rear cover 50 can be integrally formed. In a forming process of the rear cover 50, structures such as a rear camera aperture, an assembly hole for a fingerprint identification module, etc., can be formed on the rear cover 50.

Components in the radio frequency assembly, such as the radio frequency transceiver module 110, the first duplexer 210, the second duplexer 220, the first filter 230, the second filter 240, the first amplifier, the second amplifier, the third amplifier, etc., can be disposed on the main board 30. The main board 30 can be further provided thereon with a grounded portion, the first antenna 310, the second antenna 320, the third antenna 330, the fourth antenna 340, and the fifth antenna 350 can be all connected with the grounded portion.

The first antenna 310, the second antenna 320, the third antenna 330, the fourth antenna 340, and the fifth antenna 350 can be disposed on the main board 30, the frame 20, or the rear cover 50. When the antennas are disposed on the frame 20, the frame can be a metal frame, and the metal frame is separated into a plurality of segments by insulating components. When the antennas are disposed on the rear cover 50, the rear cover can be a metal rear cover, and the rear cover can be separated into a plurality of segments.

The first antenna 310, the second antenna 320, the third antenna 330, the fourth antenna 340, and the fifth antenna 350 can be special antennas for low frequency signals, or can be antennas shared by high frequency signals. When they are antennas shared by high frequency signals, the main board 30 can be further provided thereon with a switching circuit, which is used to switch connections between the antennas and radio frequency modules with different frequencies.

In the electronic device provided by this embodiment of the present disclosure, the first antenna in the radio frequency assembly transmits a first transmission signal and receives a first primary reception signal, the first duplexer insulates the first transmission signal from the first primary reception signal, the second antenna transmits a second transmission signal and receives a second primary reception signal, and the second duplexer insulates the second transmission signal from the second primary reception signal; wherein, the first antenna can be used for 4G communication, and the second antenna can be used for 5G communication, therefore the electronic device is enabled to achieve communication in dual-connection of 4G and 5G in a non-independent networking mode, and is simple in structure and easy to be realized.

Those skilled in the art will easily think of other embodiments of the present disclosure after considering the description and practicing the disclosure disclosed herein. This application is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are only regarded as exemplary, and the true scope and spirit of the present disclosure are indicated by the appended claims.

What is claimed is:

1. A radio frequency assembly, comprising:
   a radio frequency transceiver module configured to transmit and receive radio frequency signals;
   a first antenna configured to transmit a first transmission signal in a first frequency band and receive a first primary reception signal in the first frequency band;
   a first duplexer having a first end connected with the radio frequency transceiver module and a second end connected with the first antenna, and configured to insulate the first transmission signal from the first primary reception signal;
   a second antenna configured to transmit a second transmission signal in a second frequency band being different from the first frequency band and receive a second primary reception signal in the second frequency band;
   a second duplexer having a first end connected with the radio frequency transceiver module and a second end connected with the second antenna, and configured to insulate the second transmission signal from the second primary reception signal;
   an additional antenna configured to receive a first diversity reception signal in the first frequency band and a second diversity reception signal in the second frequency band; and
   an additional filter connected to the additional antenna and the radio frequency transceiver module respectively, and configured to filter the first diversity reception signal and the second diversity reception signal;
   wherein the first frequency band is a frequency band in a Long Term Evolution (LTE) low frequency band or a frequency band in a 5G new radio (NR) low frequency band, and the second frequency band is a frequency band in the LTE low frequency band or a frequency band in the 5G (NR) NR low frequency band; and
   wherein an uplink frequency band in the first frequency band is higher than a downlink frequency band in the first frequency band, and an uplink frequency band in the second frequency band is lower than a downlink frequency band in the second frequency band.

2. The radio frequency assembly according to claim 1, wherein the first end of the first duplexer comprises a first sub-end and a second sub-end, the first sub-end is connected to the radio frequency transceiver module to transmit the first transmission signal, and the second sub-end is connected to the radio frequency transceiver module to transmit the first primary reception signal.

3. The radio frequency assembly according to claim 2, further comprising:
a first amplifier circuit having a first end connected to the radio frequency transceiver module and a second end connected to the first sub-end of the first duplexer and configured to amplify the first transmission signal.

4. The radio frequency assembly according to claim 1, wherein the first end of the second duplexer comprises a first sub-end and a second sub-end, the first sub-end is connected to the radio frequency transceiver module to transmit the second transmission signal, and the second sub-end is connected to the radio frequency transceiver module to transmit the second primary reception signal.

5. The radio frequency assembly according to claim 4, further comprising:
a second amplifier circuit having a first end connected to the radio frequency transceiver module and a second end connected to the first sub-end of the second duplexer and configured to amplify the second transmission signal.

6. The radio frequency assembly according to claim 1, wherein the first antenna is configured to receive the first primary reception signal in a 4G frequency band and transmit the first transmission signal in the 4G frequency band, the second antenna is configured to receive the second primary reception signal in a 5G frequency band and transmit the second transmission signal in the 5G frequency band, and the additional antenna is configured to receive the first diversity reception signal in the 4G frequency band and the second diversity reception signal in the 5G frequency band.

7. The radio frequency assembly according to claim 6, wherein the radio frequency assembly is configured to implement dual connection communication in B20 and n28a frequency bands; a working frequency band of the first antenna is the B20 frequency band, a working frequency band of the second antenna is the n28a frequency band, and a working frequency band of the additional antenna covers at least a part of the B20 frequency band and a part of the n28a frequency band.

8. The radio frequency assembly according to claim 1, wherein the first antenna is configured to receive the first primary reception signal in a first 4G frequency band and transmit the first transmission signal in the first 4G frequency band, the second antenna is configured to receive the second primary reception signal in a second 4G frequency band and transmit the second transmission signal in the second 4G frequency band, and the additional antenna is configured to receive the first diversity reception signal in the first 4G frequency band and the second diversity reception signal in the second 4G frequency band.

9. The radio frequency assembly according to claim 8, wherein the radio frequency assembly is configured to implement carrier aggregation in B20 and B28a frequency bands; a working frequency band of the first antenna is the B20 frequency band, a working frequency band of the second antenna is the B28a frequency band, and a working frequency band of the additional antenna covers at least a part of the B20 frequency band and a part of the B28a frequency band.

10. The radio frequency assembly according to claim 1, wherein the first antenna is configured to receive the first primary reception signal in a first 5G frequency band and transmit the first transmission signal in the first 5G frequency band, the second antenna is configured to receive the second primary reception signal in a second 5G frequency band and transmit the second transmission signal in the second 5G frequency band, and the additional antenna is configured to receive the first diversity reception signal in the first 5G frequency band and the second diversity reception signal in the second 5G frequency band.

11. The radio frequency assembly according to claim 10, wherein the radio frequency assembly is configured to implement carrier aggregation in n20 and n28a frequency bands; a working frequency band of the first antenna is the n20 frequency band, a working frequency band of the second antenna is the n28a frequency band, and a working frequency band of the additional antenna covers at least a part of the n20 frequency band and a part of the n28a frequency band.

12. The radio frequency assembly according to claim 1, wherein a working frequency band of the first antenna comprises the uplink frequency band in the first frequency band, a working frequency band of the second antenna comprises the uplink frequency band in the second frequency band, and a working frequency band of the additional antenna comprises both the downlink frequency band in the first frequency band and the downlink frequency band in the second frequency band.

13. The radio frequency assembly according to claim 12, wherein a lower limit of the working frequency band of the first antenna is higher than an upper limit of the working frequency band of the second antenna, and the working frequency band of the additional antenna is arranged between the lower limit of the working frequency band of the first antenna and the upper limit of the working frequency band of the second antenna.

14. A radio frequency assembly, comprising:
a radio frequency transceiver module configured to transmit and receive radio frequency signals;
a first antenna configured to transmit a first transmission signal in a first frequency band and receive a first primary reception signal in the first frequency band;
a first duplexer having a first end connected with the radio frequency transceiver module and a second end connected with the first antenna, and configured to insulate the first transmission signal from the first primary reception signal;
a second antenna configured to transmit a second transmission signal in a second frequency band being different from the first frequency band and receive a second primary reception signal in the second frequency band;
a second duplexer having a first end connected with the radio frequency transceiver module and a second end connected with the second antenna, and configured to insulate the second transmission signal from the second primary reception signal;
a third antenna configured to receive a first diversity reception signal in the first frequency band; and
a first filter connected to the third antenna and the radio frequency transceiver module respectively and configured to filter the first diversity reception signal;

wherein the first frequency band is a frequency band in a Long Term Evolution (LTE) low frequency band or a frequency band in a 5G new radio (NR) low frequency band, and the second frequency band is a frequency band in the LTE low frequency band or a frequency band in the 5G NR low frequency band; and wherein an uplink frequency band in the first frequency band is higher than a downlink frequency band in the first frequency band, and an uplink frequency band in the second frequency band is lower than a downlink frequency band in the second frequency band.

15. The radio frequency assembly according to claim 14, further comprising:
a fourth antenna configured to receive a second diversity reception signal in the second frequency band; and
a second filter connected to the fourth antenna and the radio frequency transceiver module respectively and configured to filter the second diversity reception signal.

16. The radio frequency assembly according to claim 15, further comprising:
a first amplifier circuit;
a second amplifier circuit; and
a plurality of third amplifier circuits;
wherein the first end of the first duplexer comprises a first sub-end and a second sub-end, the first sub-end is coupled to the radio frequency transceiver module to transmit the first transmission signal, and the second sub-end is coupled to the radio frequency transceiver module to transmit the first primary reception signal;
wherein the first amplifier circuit has a first end connected to the radio frequency transceiver module and a second end connected to the first sub-end of the first duplexer, and is configured to amplify the first transmission signal;
wherein the first end of the second duplexer comprises a first sub-end and a second sub-end, the first sub-end is coupled to the radio frequency transceiver module to transmit the second transmission signal, and the second sub-end is coupled to the radio frequency transceiver module to transmit the second primary reception signal;
wherein the second amplifier circuit has a first end connected to the radio frequency transceiver module and a second end connected to the first sub-end of the second duplexer, and is configured to amplify the second transmission signal; and
wherein a first one of the plurality of third amplifier circuits is connected between the radio frequency transceiver module and the first filter, a second one of the plurality of third amplifier circuits is connected between the radio frequency transceiver module and the second sub-end of the first duplexer, a third one of the plurality of third amplifier circuits is connected between the radio frequency transceiver module and the second sub-end of the second duplexer, and a fourth one of the plurality of third amplifier circuits is connected between the radio frequency transceiver module and the second filter.

17. An electronic device comprising a main board and a radio frequency assembly, wherein the radio frequency assembly comprises:
a radio frequency transceiver module disposed on the main board and configured to transmit and receive radio frequency signals;
a first antenna configured to transmit a first transmission signal in a first frequency band and receive a first primary reception signal in the first frequency band;
a first duplexer disposed on the main board and having a first end connected with the radio frequency transceiver module and a second end connected with the first antenna, and configured to insulate the first transmission signal from the first primary reception signal;
a second antenna configured to transmit a second transmission signal in a second frequency band being different from the first frequency band and receive a second primary reception signal in the second frequency band;
a second duplexer disposed on the main board and having a first end connected with the radio frequency transceiver module and a second end connected with the second antenna, and configured to insulate the second transmission signal from the second primary reception signal;
an additional antenna configured to receive a first diversity reception signal in the first frequency band and a second diversity reception signal in the second frequency band; and
an additional filter disposed on the main board and connected to the additional antenna and the radio frequency transceiver module respectively, and configured to filter the first diversity reception signal and the second diversity reception signal;
wherein the first frequency band is a frequency band in a Long Term Evolution (LTE) low frequency band or a frequency band in a 5G new radio (NR) low frequency band, and the second frequency band is a frequency band in the LTE low frequency band or a frequency band in the 5G NR low frequency band; and
wherein an uplink frequency band in the first frequency band is higher than a downlink frequency band in the first frequency band, and an uplink frequency band in the second frequency band is lower than a downlink frequency band in the second frequency band.

18. The electronic device according to claim 17, wherein the first antenna is configured to receive the first primary reception signal in the first frequency band and transmit the first transmission signal in the first frequency band, the second antenna is configured to receive the second primary reception signal in the second frequency band and transmit the second transmission signal in the second frequency band, the additional antenna is configured to receive the first diversity reception signal in the first frequency band and the second diversity reception signal in the second frequency band, and the radio frequency assembly is configured to implement dual connection communication in the first and second frequency bands or carrier aggregation in the first and second frequency bands.

19. The electronic device according to claim 18, wherein the first antenna is configured to receive the first primary reception signal in a 4G frequency band and transmit the first transmission signal in the 4G frequency band, the second antenna is configured to receive the second primary reception signal in a 5G frequency band and transmit the second transmission signal in the 5G frequency band, and the additional antenna is configured to receive the first diversity reception signal in the 4G frequency band and the second diversity reception signal in the 5G frequency band.

* * * * *